Sept. 6, 1955　　　　　E. F. EDWARDS　　　　　2,717,205
PROCESS OF TREATING LOW GRADE ORES
Filed July 12, 1950　　　　　　　　　　　　　3 Sheets-Sheet 1

Inventor
Enoch F. Edwards
By Williamson & Williamson
Attorneys

Sept. 6, 1955 E. F. EDWARDS 2,717,205
PROCESS OF TREATING LOW GRADE ORES
Filed July 12, 1950 3 Sheets-Sheet 2
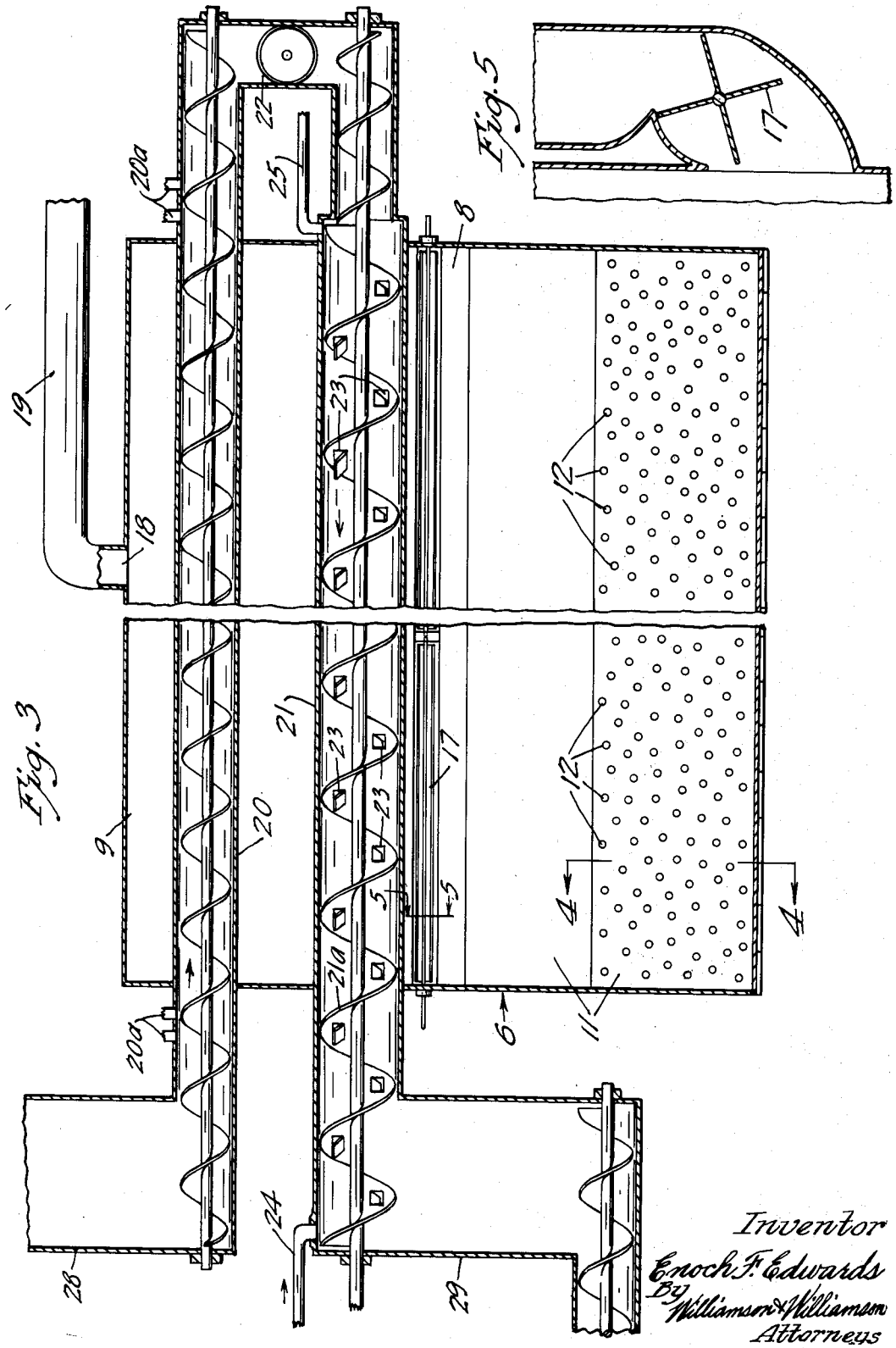
Inventor
Enoch F. Edwards
By Williamson & Williamson
Attorneys

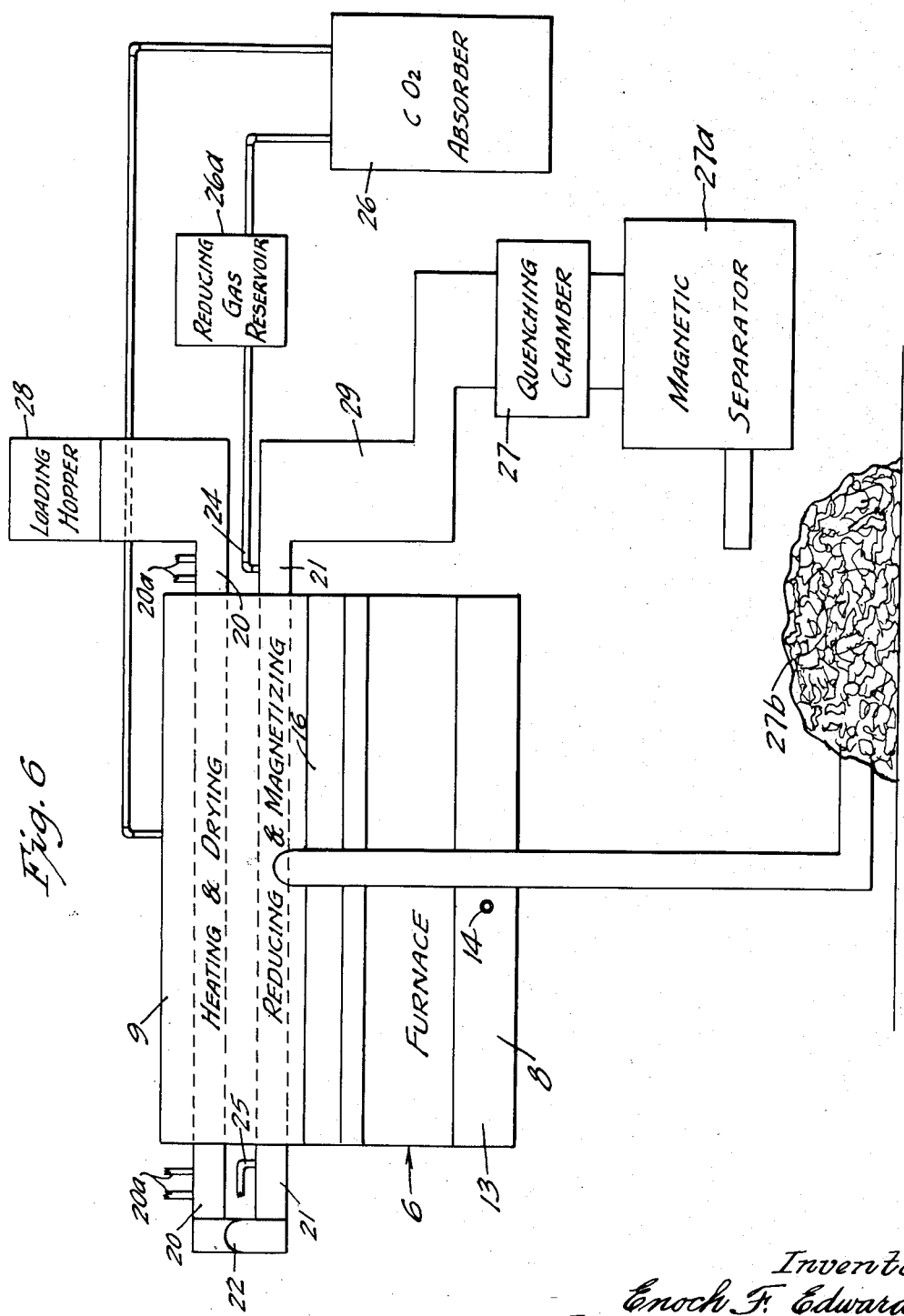

United States Patent Office 2,717,205
Patented Sept. 6, 1955

2,717,205

PROCESS OF TREATING LOW GRADE ORES

Enoch F. Edwards, Nashwauk, Minn., assignor to BeVant Mining & Refining Corporation, Duluth, Minn., a corporation of Minnesota Application July 12, 1950, Serial No. 173,305

3 Claims. (Cl. 75—5)

This invention relates generally to a method for treating low-grade nonmagnetic iron ores to concentrate the same into suitable condition for smelting.

With the rapidly depreciating supplies of high grade hemetite iron ore and the relatively large supplies of low grade nonmagnetic ores available it has been an unsolved problem for some time to provide an economically practical method for treating the low grade nonmagnetic ores, and it has also been a problem after the magnetic separation of magnetic ores to agglomerate the concentrate into a charge suitable for blast furnace burden.

It is an object of my present invention to provide a method for treating low grade nonmagnetic ores to initially magnetize the same and after magnetic separation thereof to sinter the concentrates into a suitable condition for blast furnace burden.

It is another object to provide apparatus constructed to sinter iron ore concentrates and to utilize the heat and gases of combustion produced thereby for reducing nonmagnetic ores to magnetic ores.

It is still another object to provide a method for concentrating and agglomerating low grade, nonmagnetic ores consisting in heating pulverized low grade ores and passing a reducing gas through the heated ore, separating the magnetized ore particles from the nonmagnetic impurities to produce ore concentrates, and finally sintering the concentrates into suitable agglomerates for blast furnace burden.

More specifically, it is an object to provide a furnace having a sintering chamber at the base thereof in which concentrated ores are charged along with a carbonaceous fuel such as peat to produce suitable sinters for blast furnace burden, said furnace being constructed to collect the gaseous products of combustion from the sintering operation and having nonmagnetic ore conveying mechanism disposed within the upper portion thereof and extending thereacross with means for utilizing the heat from the sintering operation as well as the reducing gases to produce magnetic ore from the low grade nonmagnetic ore.

It is still another specific object to provide a method of reducing nonmagnetic iron ore to magnetic ore, consisting in collecting the products of combustion from a sintering furnace, removing a substantial portion of the $CO_2$ gas from said products of combustion to produce a highly efficient reducing gas made up substantially entirely of $CO$ gas and $H_2$ gas and passing said reducing gas through nonmagnetic ore which is heated in said furnace.

These and other objects and advantages of my invention will more fully appear from the following description made in connection with the accompanying drawings wherein like reference characters refer to similar parts throughout the several views and in which:

Fig. 3 is a central longitudinal vertical sectional view of the furnace shown in Fig. 1;

Fig. 5 is a fragmentary vertical sectional view taken substantially along the line 5—5 of Fig. 3; and Fig. 6 is a diagrammatic view of an entire system for treating low grade nonmagnetic ore and producing through a substantially continuous process concentrated sinters suitable for blast furnace burden.

Figure 1:
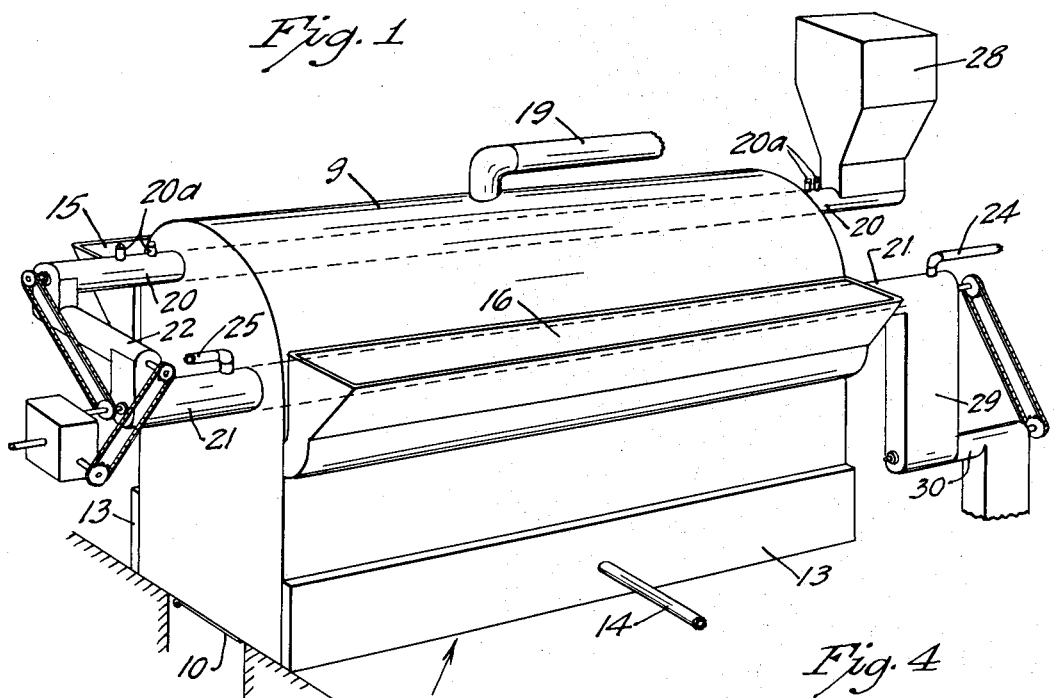
Fig. 1 is a perspective view of my ore treating furnace.
Figure 2:
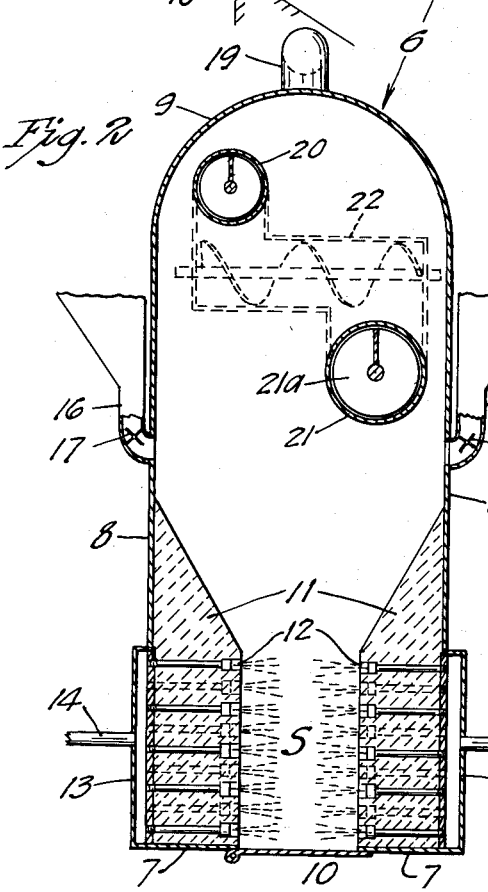
Fig. 2 is a transverse vertical sectional view of the furnace shown in Fig. 1.
Figure 4:
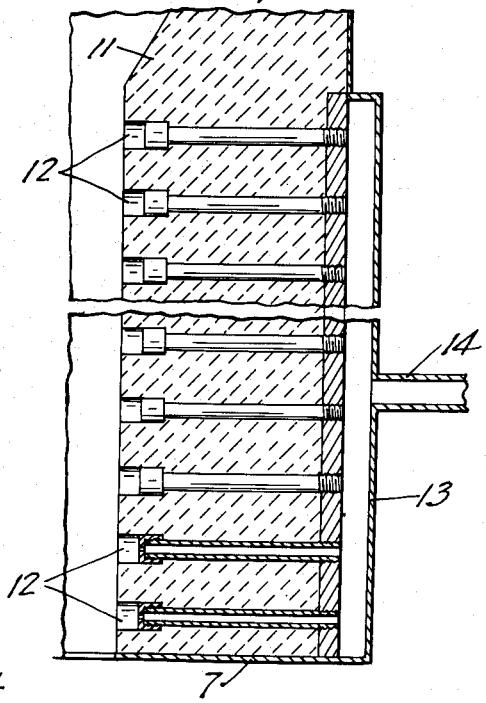
Fig. 4 is a fragmentary vertical sectional view taken substantially along the line 4—4 of Fig. 3.

As shown in the accompanying drawings, I provide a closed substantially air-tight furnace 6 having a bottom 7 and side walls 8, and in the form shown, a curved top 9. In the form shown the bottom 7 has a hinged trap door 10. The lower portion of the side walls 8 are lined with refractory material 11, as best shown in Fig. 2, and a relatively large number of spaced passages 12 extend horizontally therethrough. The upper portions of the refractory lining material are sloped inwardly toward the bottom and a sintering chamber S is formed between the lower portions thereof above the trap door 10. Oxygen is supplied to the chamber S through the passages 12 as by the manifold chambers 13 on each side which are adapted to receive relatively pure oxygen from a suitable source of supply as through the conduits 14. 95% pure oxygen has been found to be satisfactory for this purpose.

A pair of inlet chutes 15 and 16 having substantially airtight feeder mechanisms 17 are provided along each side of the furnace walls 8. Chute 15 is adapted to feed ore concentrates into the sintering chamber and chute 16 is adapted to feed carbonaceous fuel such as peat. The curved top 9 of the furnace is closed except for the outlet 18, as best shown in Fig. 3, which has a gas-carrying pipe 19 connected therewith which carries the gaseous products of combustion to a suitable treating station which removes the $CO_2$ gas therefrom, leaving a gas containing approximately 60% $CO$ and 25% $H_2$ gas, both of which are good reducing agents.

In the form shown, a pair of low grade ore conveyors 20 and 21 are disposed within the upper portion of the furnace and extend thereacross longitudinally thereof. These conveyors carry the low grade nonmagnetic ore longitudinally through the upper portion of the furnace 6. The conveyor 20 serves to preheat and dry the ore and in the form shown has a number of vapor outlets 20a in the outer end portions thereof and delivers the ore to a transversely disposed interconnection conveyor 22 which carries the ore to the reducing conveyor 21. The blade of the spiral 21a within the reducing conveyor 21 has a number of ore agitating openings 23 formed therethrough and the housing surrounding the spiral has a reducing gas inlet 24 at one end thereof and a gas outlet 25 at the other end thereof. This reducing gas which originally contains approximately 12% $CO_2$ is collected from the top of the furnace and preferably has the $CO_2$ removed therefrom as by the conventional process for the absorption of $CO_2$ from gaseous mixtures as by being washed with alkaline liquids, such as $KOH$, $NaOH$, $Ca(OH_2)$, etc. This process is disclosed in Patent Number 1,290,244 granted to Kramers in 1919. The gas washing apparatus for absorbing the $CO_2$ is shown in Fig. 6 and is designated by the numeral 26. The reducing gas thus produced, which then contains 60.7% $CO$, 25.7% $H_2$, 4.6% $N_2$, 4.5% $CH_4$, 3.4% illuminants, and 1% $CO_2$, passes into a reducing gas reservoir 26a and from there is supplied to reducing gas inlet 24 in the conveyor 21 to reduce and magnetize the ore being carried therethrough. This magnetized ore is discharged from said conveyor into a hopper 29 and is carried from said hopper to a quenching chamber 27 by an auger conveyor 30 and after being cooled therein is transferred to the magnetic separator 27a where the magnetic concentrates are removed from the tailings. The concentrates are discharged from the magnetic separators 27a to a drying area indicated at 27b and are carried from the drying area to the supply chute 15 when the sintering chamber S is to be charged.

The following is a description of the operation of my improved ore treating furnace. The pulverized low grade nonmagnetic ore is introduced into a hopper 28 which delivers the same to the upper heating and drying conveyor 20. This conveyor carries the ore through the upper portion of the furnace where the same is heated and a large percentage of the moisture is driven off through vapor outlets 20a. This preheated ore is then carried to the reducing conveyor by the transversely disposed interconnection conveyor 22 and is thoroughly agitated by the windows in the spiral 21a as the reducing gas is passed through the conveyor tube from inlet 24 to outlet 25. The conveyor 22 is substantially airtight and forms in effect an air lock to maintain a reducing atmosphere around the heated ore as it is carried therethrough. From the conveyor 21 the magnetized ore is delivered to a hopper 29 and from there is delivered to a magnetic separation unit 27a after being cooled in the quenching chamber 27. After the same has been magnetically separated the concentrates are discharged to a drying area 27b and are transferred to the sintering chamber S through the chute 15 as it is needed and peat is introduced through chute 16. Oxygen is supplied for the sintering operation through passages 12 and when the charge has been completely sintered the trap door 19 is opened and the sinters are dropped out of the chamber S and a new charge is introduced thereto. The gases produced by the sintering operation not only heat the conveyors 20 and 21 and the ore being carried thereby, but are carried by pipe 19 to a suitable $CO_2$ absorption unit 26 and from said unit are carried to the inlet 24 for introduction into the conveyor 21. The results have been found to be somewhat better when the gas is passed through the conveyor 21 in the opposite direction from the flow of the ore and a more intimate contact is obtained between the ore and the reducing gases in this manner. The chemical reactions which take place during the reduction of the nonmagnetic ore to magnetic ore by the reducing gases containing large percentages of $H_2$ and CO is as follows:

$$CO + 3Fe_2O_3 = CO_2 + 2Fe_3O_4$$

$$H_2 + 3Fe_2O_3 = H_2O + 2Fe_3O_4$$

The steps in my method of treating the ore are indicated as follows:

Heating and drying pulverized nonmagnetic low grade ore, delivering said preheated nonmagnetic ore to a reducing and magnetizing conveyor mechanism, passing reducing gas through said conveyor mechanism, cooling said reduced ore, separating the magnetized ore to produce concentrates, drying the ore concentrates, and sintering the dried concentrates.

It will be seen from the foregoing description and drawings that I have provided a highly efficient method and apparatus for treating low grade nonmagnetic iron ores to ultimately produce agglomerated concentrated ore sinters through a continuous step by step operation in which the essential steps are to initially reduce and magnetize the ore by passing reducing gases through the heated ore, by separating the magnetized ore and by sintering the concentrates produced by the magnetic separation. The heat of the sintering process is used to heat the low grade ores to permit the reducing reaction to take place when the reducing gases are passed in contact therewith and the reducing gases used for the magnetizing of the low grade ores are produced from the sintering operation. This continuous step by step process as carried out with the apparatus disclosed herein is extremely efficient and is believed to be novel in the art.

It will, of course, be understood that various changes may be made in the form, details, arrangement and proportions of the parts without departing from the scope of my invention.

What I claim is:

1. The process of treating iron ore which comprises sintering pretreated concentrated ore in a furnace and producing hot gases thereby, using said hot gases for preheating and drying raw ore to be treated out of contact with said gases, conveying the preheated ore to a reducing ore treating chamber, obtaining reducing gases from the expended hot exhaust gases by removing the $CO_2$ from said gases, agitating the preheated ore in the reducing chamber and passing the reducing gas from which the $CO_2$ has been substantially removed through the agitated ore, and heating the ore in the reducing chamber by and out of contact with the exhaust gases from the sintering operation, while the ore is being agitated.

2. The process of treating iron ore which comprises sintering pretreated concentrated ore in a furnace and producing hot gases thereby, conveying the ore to be concentrated through a heating passage and heating it by and out of contact with said gases generated by the sintering operation, constantly agitating the ore to be concentrated during its travel through the passage being heated by the hot gases, separating reducing gas from the expended hot gases, producing intimate contact between said reducing gas and the agitated ore being conveyed through the passage being heated by and out of contact with the hot gases to reduce said ore, concentrating the reduced ore by separating the gangue therefrom, and introducing the concentrated ore into the sintering portion of said furnace.

3. The process set forth in claim 2, including the additional step of conveying the untreated ore through the upper portion of the furnace to preheat the said untreated ore.

References Cited in the file of this patent

UNITED STATES PATENTS

| Number | Name | Date |
|---|---|---|
| 865,658 | Scott | Sept. 10, 1907 |
| 1,256,623 | Westberg et al. | Feb. 19, 1918 |
| 1,305,817 | McAfee | June 3, 1919 |
| 1,403,576 | Stansfield | Jan. 17, 1922 |
| 1,531,695 | Eustis | Mar. 31, 1925 |
| 1,610,424 | Cederquist | Dec. 14, 1926 |
| 2,057,554 | Bradley | Oct. 13, 1936 |
| 2,204,576 | Davis | June 18, 1940 |
| 2,269,465 | Lykken | Jan. 13, 1942 |
| 2,429,372 | Savage | Oct. 21, 1947 |
| 2,441,383 | Babb | May 11, 1948 |
| 2,441,594 | Ramseyer | May 18, 1948 |